United States Patent [19]

Neal

[11] Patent Number: 4,473,966
[45] Date of Patent: Oct. 2, 1984

[54] COMBINATION BOBBER AND FISH HOOK REMOVER

[76] Inventor: Norman Neal, 8583 Narcissus, Seminole, Fla. 33542

[21] Appl. No.: 383,541

[22] Filed: Jun. 1, 1982

[51] Int. Cl.³ ............................................. A01K 93/00
[52] U.S. Cl. ...................................... 43/43.1; 43/53.5
[58] Field of Search ............................... 43/43.1, 53.5

[56] References Cited

U.S. PATENT DOCUMENTS

| | | | |
|---|---|---|---|
| 2,797,523 | 7/1957 | Dillard | 43/53.5 |
| 2,984,931 | 5/1961 | Shaw | 43/53.5 |
| 4,068,400 | 1/1978 | McCoy | 43/53.5 |

FOREIGN PATENT DOCUMENTS

| | | | |
|---|---|---|---|
| 163954 | 7/1958 | Italy | 43/43.1 |
| 2073562 | 6/1980 | United Kingdom | 43/43.1 |

Primary Examiner—Nicholas P. Godici
Assistant Examiner—Marc Hodak
Attorney, Agent, or Firm—Ronald E. Smith

[57] ABSTRACT

A combination bobber and fish hook remover means. An elongate rod member is fixedly secured to and depends from a bouyant bobber means. The rod member has a groove that extends from its mid section to its free end, and a sleeve member having a slot is mounted for rotation relative to the rod member so that when the slot and groove are in alignment with one another, a fish line can be inserted into the groove. Misalignment of the slot and groove then locks the line into the groove so that the invention can be used. A transverse bore formed in the rod member and an eyehook attached to the top of the bobber, together with a cross bar member, cooperate to provide a means for tying the novel combinational apparatus to a fish line.

6 Claims, 4 Drawing Figures

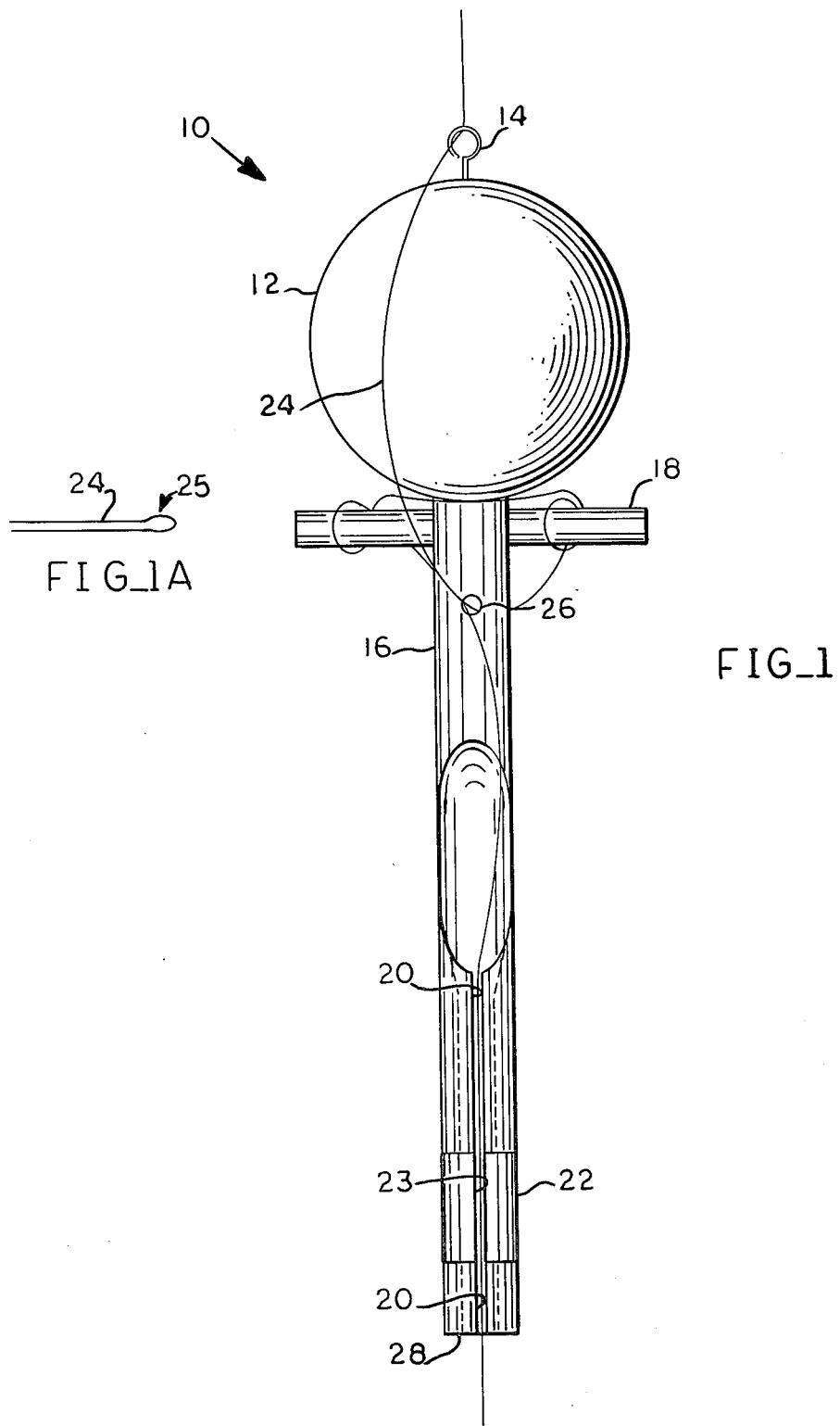

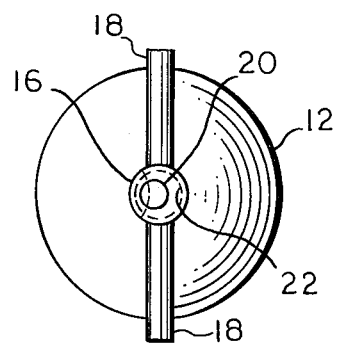
FIG_2
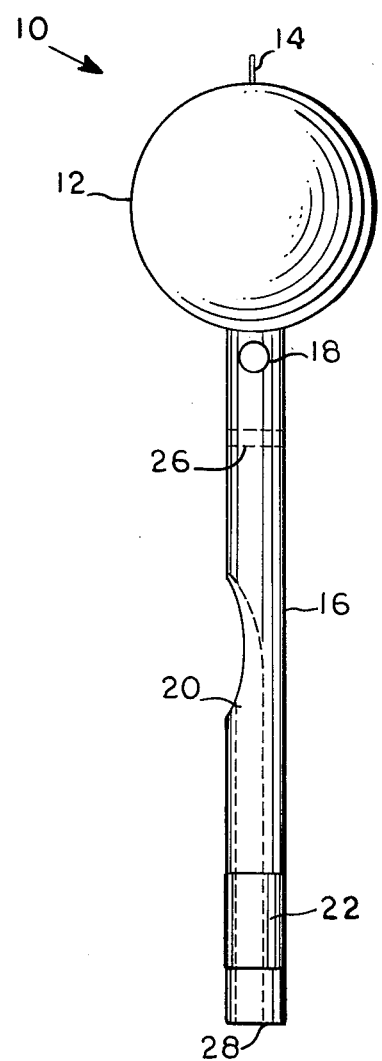
FIG_3

COMBINATION BOBBER AND FISH HOOK REMOVER

BACKGROUND OF THE INVENTION

1. Field of the Invention.

This invention relates, generally, to devices having utility in the fishing industry, and more specifically relates to devices that combine the functional features of bobber means and fish hook remover means.

2. Description of the Prior Art.

The following disclosures were found in the course of a search of United States patents:

| Patentee | U.S. Pat. No. | Date of Issue |
| --- | --- | --- |
| Jaske | 2,491,182 | 12/13/49 |
| Hagen | 2,497,356 | 02/14/50 |
| Lambach | 2,607,153 | 08/19/52 |
| Shoenfelt | 2,636,305 | 04/28/53 |
| Marconi | 2,790,187 | 04/30/57 |

The field of search covered Class/sublass 43/43.1, 43.11, 49, 17.2.

It is clear that a combination bobber means and fish hook remover does not appear in the prior art.

SUMMARY OF THE INVENTION

The longstanding but heretofore unfulfilled need for a device that provides to the fisherman a bobber means and a fish hook remover means in one unit is now provided in the form of a bobber means having a depending rod which serves as a fish hook remover means.

The bobber means is spherical in configuration and is formed of any bouyant material. An eyehook means protrudes from its topmost surface. The elongate rod member depends from the lowermost surface of the bobber such that the longitudinal axis of symmetry of the rod coincides with the vertical axis of symmetry of the bobber when the bobber is deployed in the water.

The rod has a transverse bore formed in its upper portion for receiving looped fish line when it is desired to affix the inventive assembly to such line. A transverse cross bar member disposed orthogonally to said bore is provided to provide a post about which opposite portions of the looped fish line are secured after such line has been inserted through the bore and the bobber has been passed through the loop. The loop formed in the line is then tightened about the rod to secure the assembly to the line, after which the proximal portion of the line—that part nearest the fisherman—is brought back through the eyehook, while the distal part thereof is laid within an elongate groove formed in said rod member. The groove begins about mid-length of the rod and extends to its distal free end.

A rotatable sleeve member that rides on the rod about mid-length of the groove is slotted to allow insertion of the line into the groove, after which insertion the sleeve is rotated relative to the rod to misalign the groove and slot to prevent inadvertant retraction of the line from the groove.

The groove is in open communication with the distal free end of the rod. Accordingly, a hooked fish is easily removed from its hook by pulling the fish line until the fish's lip abuts the crescent-shaped free end of the rod.

It is therefore seen that the primary object of the invention is to combine a bobber means and a fish hook removing means in one easy to make and easy to use assembly.

Another object is to provide such an assembly that is not only easy to attach to a fishing line, but to provide such an assembly that is specifically constructed to ensure that the assembly will not inadvertently disengage from such fishing line once secured thereto.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a front elevational view of the preferred embodiment of the invention.

FIG. 1A is a diagrammatic representation of a line that has been formed into a loop.

FIG. 2 is a bottom plan view thereof.

FIG. 3 is a side elevational view thereof.

DETAILED DESCRIPTION OF THE PREFERRED EMBODIMENT

Referring now to FIG. 1, there it will be seen that the preferred embodiment of the invention is generally indicated by the reference numeral 10. The assembly 10 includes a spherical bobber means 12 formed of any bouyant material, from which bobber means 12 protrudes an eye hook means 14 the function of which will be described hereinafter.

An elongate rod member 16 is fixedly secured to, or integrally formed with, the bobber 12 and depends therefrom as shown. As best shown in FIG. 3, the longitudinal axis of symmetry of the rod 16 and the vertical axis of symmetry of the bobber 12 coincide.

The rod 16 is impaled by transversely disposed cross bar member 18. The length of the cross bar 18 is approximately equal to the diameter of the bobber 12. When the inventive assembly is affixed to a fishing line in the manner hereinafter described, the cross bar member 18 plays an important role by providing a post around which the line may be wrapped.

An elongate groove 20 is formed in the forward-facing surface of the rod 16 as shown, and extends to the free end 28 of the rod member 16. FIG. 2 best depicts the open communication of the groove 20 with the distal free end 28 of the rod 16.

A cylindrical locking sleeve 22 is provided with slot 23 that enters into registration with groove 20 once attendant each rotation of the sleeve 22 about the rod 16. Registration between slot 23 and groove 20 is depicted in FIG. 1. In a commercial embodiment, not specifically shown, the sleeve 22 lies flush with the surface of the rod 16. In FIG. 1, the sleeve 22 is shown in a non-flush condition for ease of illustration purposes. In a commercial embodiment, the rod 16 is provided with a recess having a depth equal to the thickness of the sleeve 22 and having a length just slightly greater than the length of the sleeve 22 so that the sleeve 22 is accommodated within said recess to provide the more aesthetic flush fit between said rod 16 and sleeve 22.

When it is desired to affix the novel assembly 10 to a fish line 24, the line is first formed into a loop as shown in FIG. 1A. The sinker (if any) and hook, not shown, will already be attached to the end of the line, of course. The fisherman preselects the exact location on the line where he or she desires the novel assembly to be. The choice depends on the type of fishing activity being undertaken, and the novel assembly is placed wherever the fisherman would normally place a conventional bobber for the particular type of fishing activity contemplated.

Loop 24 passed through transverse bore 26 that extends completely through the rod member 16, from the front of the assembly 10, as shown in FIG. 3. The loop 24 is then separated into two (2) opposing portions of substantially equal length, and bobber 12 is passed through the loop. The bight portion 25 of the loop 24 will now be disposed forwardly of the bobber 12, but the opposing portions of the loop 24 will be disposed rearwardly of the cross bar 18, both of said opposing portions being associated with opposite halves of said cross bar 18. The opposing portions are then given one turn about their associated halves of the cross bar 18, while the bight portion 25 of the loop 24 is maintained forwardly of the bobber 12. The loop 24 is then tightened about the uppermost portion of rod 16. The portion of the line that is nearest the fisherman, i.e., the proximal portion thereof, is reversely bent and brought through eyehook 14. The distal portion of the line is disposed interiorly of the groove 20, sleeve 22 being of course properly aligned to allow such insertion. Upon placing the line into such groove 20, slot 23 and groove 20 are misaligned by rotation of sleeve 22 relative to rod member 16 so that the line cannot inadvertently retract from such groove 20. The novel assembly is then properly affixed to the line and will not separate therefrom without human intervention or line breaking.

The elongate rod 16 will maintain the bobber in proper alignment at all times. More importantly, when a fish is hooked, the fisherman can grasp the bobber 12 in one hand, and pull the line toward the bobber with the other hand while leaving such line in the groove 20. When the hook abuts the free end 28 of the rod 16, such hook will dislodge from the fish's lip.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
That which is claimed is:

1. A combination bobber and fishhook remover, comprising, a generally spherical bobber means formed of a material that floats when disposed in a body of water,
   an elongate stabilizing rod member having one end thereof fixedly secured to said bobber means, said rod member depending from said bobber means when said bobber means is deployed in a body of water,
   said rod member having a longitudinal axis of symmetry that is coaxial with the vertical axis of symmetry of said bobber means when said bobber means is deployed in said body of water,
   a first line-receiving means provided as a part of said rod member, downwardly of said bobber means,
   a second line-receiving means provided as a part of said bobber means, just upwardly of the uppermost surface of said bobber means,
   a third line-receiving means provided as a part of said rod member adjacent the distal free end thereof, and
   a transversely disposed cross bar member provided as a part of said rod member and disposed at the uppermost end of said rod member so that said first line-receiving means provided as a part of said rod member is disposed just downwardly of said cross bar member.

2. The combination of claim 1, wherein said first line receiving means comprises a transversely disposed bore means formed in said rod member, said bore means being oriented orthogonally to the longitudinal axis of symmetry of said cross bar means.

3. The combination of claim 2, wherein said second line-receiving means comprises an eye hook member fixedly secured to said bobber means at the uppermost surface thereof, said eye hook member oriented so that it is in substantial parallel alignment with said cross bar member, thereby defining an aperture means the longitudinal axis of symmetry of which is in substantial parallel alignment with the longitudinal axis of symmetry of said bore means.

4. The combination of claim 3, wherein said third line-receiving means comprises at least in part an elongate groove means formed in said rod member, said groove means in angular alignment with said bore means, and said groove means extending from substantially mid length of said rod member to the free end thereof.

5. The combination of claim 4, further comprising a locking means for transiently confining a length of fish line disposed in said groove means within said groove means.

6. The combination of claim 5, wherein said locking means comprises a cylindrical sleeve member that is rotatable about its and said rod member's common longitudinal axis of symmetry, said sleeve member having a slot formed therethrough that is registerable with said groove means attendant rotation of said sleeve member relative to said rod member.

* * * * *